United States Patent
Rosenberg et al.

(10) Patent No.: US 11,719,593 B2
(45) Date of Patent: Aug. 8, 2023

(54) SMALL HYDRAULIC LEAK DETECTION AND RELATED METHODS

(71) Applicant: Continental Automotive Systems, Inc., Auburn Hills, MI (US)

(72) Inventors: Lee Rosenberg, Waterford, MI (US); Keerthan Shetty, Rochester, MI (US); Kyle Hagen, Lake Orion, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 512 days.

(21) Appl. No.: 16/843,728

(22) Filed: Apr. 8, 2020

(65) Prior Publication Data

US 2021/0318199 A1    Oct. 14, 2021

(51) Int. Cl.
| | |
|---|---|
| *G01M 3/00* | (2006.01) |
| *G01M 3/26* | (2006.01) |
| *B60T 17/22* | (2006.01) |
| *B60T 13/66* | (2006.01) |
| *B60T 13/68* | (2006.01) |
| *B60T 13/74* | (2006.01) |

(52) U.S. Cl.
CPC ............. *G01M 3/26* (2013.01); *B60T 13/662* (2013.01); *B60T 13/686* (2013.01); *B60T 13/745* (2013.01); *B60T 17/221* (2013.01); *B60T 2270/402* (2013.01); *B60T 2270/403* (2013.01); *B60T 2270/404* (2013.01); *B60T 2270/406* (2013.01); *B60T 2270/88* (2013.01)

(58) Field of Classification Search
CPC ........ G01M 3/26; G01M 3/2846; G01M 3/00; B60T 17/221; B60T 2270/402; B60T 2270/404; B60T 2270/406; B60T 7/042; B60T 13/662; B60T 13/686; B60T 13/745
USPC ........................................... 73/39
See application file for complete search history.

(56) References Cited

U.S. PATENT DOCUMENTS

| | | | | |
|---|---|---|---|---|
| 10,124,783 | B2 * | 11/2018 | Spieker ................. | B60T 13/662 |
| 2003/0038538 | A1 * | 2/2003 | Niepelt ................. | B60T 13/686 303/3 |
| 2005/0001481 | A1 * | 1/2005 | Kley ..................... | B60T 8/5037 303/191 |
| 2005/0162008 | A1 * | 7/2005 | Bickel ................... | B60T 13/686 303/113.4 |
| 2018/0118183 | A1 * | 5/2018 | Spieker ................. | B60T 13/146 |
| 2018/0297574 | A1 * | 10/2018 | Zimmermann ....... | B60T 8/4081 |
| 2021/0070273 | A1 * | 3/2021 | Timm ................... | B60T 13/745 |

FOREIGN PATENT DOCUMENTS

DE    69937155 T2    1/2008

* cited by examiner

*Primary Examiner* — Shardul D Patel

(57) ABSTRACT

A method for detecting a small hydraulic leak of braking fluid in a vehicle, the vehicle having at least a first braking circuit and a second braking circuit, the method includes determining whether system braking pressure falls within a predetermined range, determining whether leakage exists in the braking circuits, determining whether the vehicle is in secure standstill, monitoring small leakage of a braking circuit while the vehicle is in secure standstill if leakage was detected and the vehicle is in the secure standstill, and isolating at least one of the braking circuits if a leakage exists in one of the braking circuits.

12 Claims, 2 Drawing Sheets

SMALL HYDRAULIC LEAK DETECTION AND RELATED METHODS

TECHNICAL FIELD

The disclosure herein relates to a system for detecting small hydraulic leaks within a braking system.

TECHNICAL BACKGROUND

Two-axle vehicles are fitted with hydraulic systems that have two brake circuits, thus ensuring that, if one of the two brake circuits fails, the vehicle can still be braked by means of the other brake circuit. In general, the wheel brakes are associated with the brake circuits in a diagonally split arrangement, in which a brake circuit acts on one front wheel and the respective diagonally opposite rear wheel. The two brake circuits are connected to a master brake cylinder, to which a brake pedal actuated by a driver to build up a corresponding brake pressure in the two brake circuits is coupled.

To implement a "brake-by-wire" brake system with a fallback level, a displacement simulator, an electrically controllable pressure source, two block valves (also referred to as connecting valves) and two circuit block valves are required in addition to the brake-pedal-actuated master brake cylinder. For the "brake-by-wire" operating mode, the wheel brakes are separated from the master brake cylinder by means of the block valves, while the wheel brakes are connected via the circuit block valves to a controllable pressure source common to both brake circuits or to a respective controllable pressure source provided for each of the brake circuits.

Such brake systems comprise a large number of hydraulic lines, which are interconnected by the valves in different ways, and therefore the occurrence of leaks cannot be excluded. Particularly in the case of "brake-by-wire" brake systems, there is the disadvantage that haptic feedback signals from the brake circuits are not transmitted to the brake pedal when said brake circuits are separated from the master brake cylinder. However, such haptic feedback is desired as a comfort feature. Therefore, a displacement simulator is connected in parallel with the master brake cylinder, said simulator imparting to the driver a pedal characteristic of a conventional brake system when the brake pedal is actuated if the wheel brakes are supplied with pressure medium from the pressure medium reservoir by the electrically controllable pressure source to generate a brake pressure. However, the disadvantage here is that it is not possible to achieve haptic feedback signals which indicate to the driver the safety and integrity of the brake system. This relates, for example, to increased volume inclusions, such as air or leaks, which are indicated in conventional brake systems by the absence of force feedback at the brake pedal. Mismatches in the volumes of a "brake-by-wire" brake system must therefore be detected electronically.

Since the brake circuits are interconnected to form a single hydraulic circuit in the "by-wire" mode in many "brake-by-wire" brake systems, it is necessary not only to detect leaks but also to locate them; it is therefore necessary to determine the brake circuit which has the leak in order to selectively isolate said brake circuit and keep the remaining brake circuit fit for braking.

In the case where additional braking force is necessary to decelerate a vehicle with a significant amount of added mass at the minimum failsafe rate of 2.44m/$_s$2, and to ensure that vehicle stability is maintained, care must be taken to isolate even small leaks in a given circuit, whether the circuit split is diagonal or front-rear.

The variations in pedal force (albeit, small) could potentially have ill effects on the accuracy and precision of the measurement/detection of small leaks (meaning those less than the minimum-detectable range of leaks during a normal in-motion brake apply). The location of the leak(s) have potential to cause destabilization of a highly-loaded and/or imbalanced vehicle (imbalanced in the sense of loads being distributed away from the center of mass). What is needed is a better strategy used to monitor and isolate small (≤1 cc/min) leaks.

BRIEF SUMMARY

A method for detecting a small hydraulic leak of braking fluid in a vehicle is described herein wherein the vehicle has at least a first braking circuit and a second braking circuit. The method includes determining whether system braking pressure falls within a predetermined range, determining whether leakage exists in the braking circuits, determining whether the vehicle is in secure standstill, monitoring small leakage of a braking circuit while the vehicle is in secure standstill if leakage was detected, and isolating at least one of the braking circuits if a leakage exists in one of the braking circuits.

In one or more embodiments, the method further includes determining whether a pressure integral threshold is met and/or the leakage is above a predetermined level is found in at least one of the braking circuits.

In one or more embodiments, the predetermined level is a leakage of >0.01 cc/bar/s.

In one or more embodiments, determining whether the pressure integral threshold is met and/or the leakage is above the predetermined level includes determining if Pint>=Kpint or $V_{lac_{cl}} < V_{lac_{ll}}$ AND $V_A > V_{disp_{max}}$ (pressure integral threshold and/or leakage criteria met).

In one or more embodiments, the predetermined leakage level is at least 1 cc/s and system pressure is 100 bar.

In one or more embodiments, the circuit isolated low level monitor is performed for at least four cycles if the pressure integral threshold is met and/or the leakage is above a predetermined level is found.

In one or more embodiments, the predetermined level is a leakage of >0.01 cc/bar/s.

In one or more embodiments, the method further includes permanently isolating the leaking circuit and cease monitoring for leakage if leakage is found in only one of the first braking circuit or the second braking circuit.

In one or more embodiments, the method further includes performing circuit isolated low level monitoring on each the first braking circuit and the second braking circuit if leakage found in each of the first braking circuit or the second braking circuit.

In one or more embodiments, the method further includes performing circuit isolated low level monitoring for each of the first braking circuit and the second braking circuit independent of one another.

In one or more embodiments, performing circuit isolated low level monitoring for each of the first braking circuit and the second braking circuit occurs for at least two additional cycles.

In one or more embodiments, if additional leakage failures are found in both circuits, a central leak failure is set, and monitoring is ceased.

In one or more embodiments, permanently isolating the leaking circuit and cease monitoring for leakage if additional leakage failures are found in only one circuit.

In one or more embodiments, the method further includes determining whether the braking fluid is at a warning level.

These and other embodiments, aspects, advantages, and features of the present invention will be set forth in part in the description which follows and will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims and their equivalents.

DETAILED DESCRIPTION

The following detailed description includes references to the accompanying drawings, which form a part of the detailed description. The drawings show, by way of illustration, specific embodiments in which the apparatus may be practiced. These embodiments, which are also referred to herein as "examples" or "options," are described in enough detail to enable those skilled in the art to practice the present embodiments. The embodiments may be combined, other embodiments may be utilized, or structural or logical changes may be made without departing from the scope of the invention. The following detailed description is, therefore, not to be taken in a limiting sense and the scope of the invention is defined by the appended claims and their legal equivalents.

Figure 1:
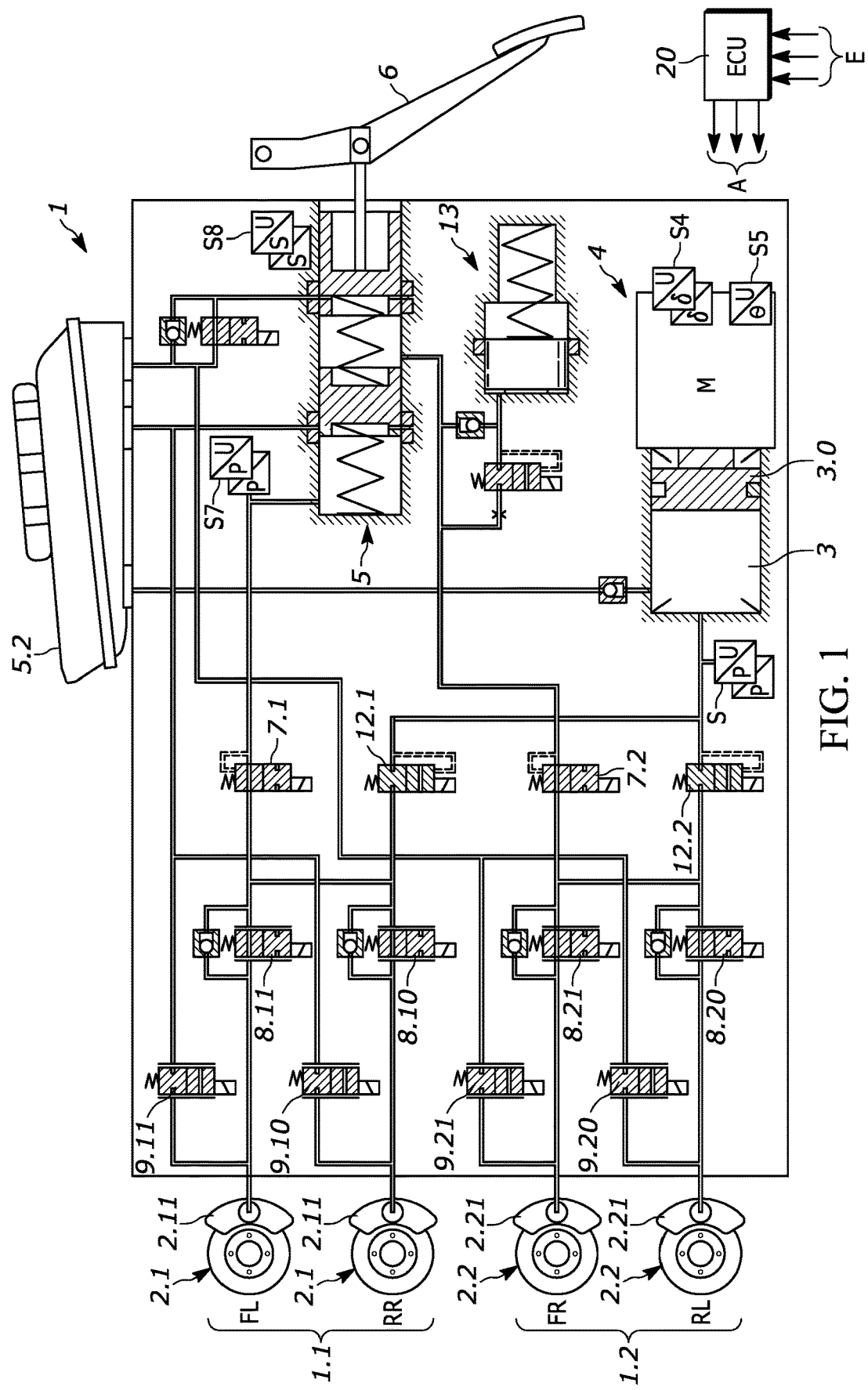
FIG. 1 illustrates a schematic diagram of a leak detection system, as constructed in accordance with one or more embodiments.

The brake system 1 shown in FIG. 1 comprises—a master brake cylinder 5 that can be actuated by means of a brake pedal 6, a displacement simulator 13 interacting with the master brake cylinder 5, —a pressure medium reservoir 5.2 connected to the master brake cylinder 5, —an electrically controllable pressure source 3, which is designed as an electrohydraulic actuator with an electric motor 4 as a drive motor, —controllable pressure modulation devices with wheel brakes 2.11 for a front left-hand wheel 2.1 (FL) and a rear right-hand wheel 2.1 (RL) and with wheel brakes 2.21 for a front right-hand wheel 2.2 (FR) and a rear left-hand wheel 2.2 (RL), and—a control unit 20.

An inlet valve and an outlet valve 8.10 and 9.10, 8.11 and 9.11 in each case form a pressure modulation device for the two wheel brakes 2.11 of a first brake circuit 1.1, and an inlet valve and an outlet valve 8.20 and 9.20, 8.21 and 9.21 in each case form a pressure modulation device for the two wheel brakes 2.21 of a second brake circuit 1.2.

In a "brake-by-wire" operating mode, the inlet valves 8.10 and 8.11, 8.20 and 8.21 are connected via a circuit block valve 12.1 and 12.2, respectively, to the electrically controllable pressure source 3 for generating a system pressure. To measure the system pressure generated by the pressure source 3, a pressure sensor S is arranged on the high-pressure side thereof. Furthermore, each outlet valve 9.10, 9.11, 9.20 and 9.21 is connected to the pressure medium reservoir 5.2.

The master brake cylinder 5 is embodied as a dual-circuit tandem master cylinder and is connected to the pressure medium reservoir 5.2. To form a fallback plane of the "brake-by-wire" brake system 1, the master brake cylinder 5 can be connected to the wheel brakes 2.11 of the first brake circuit 1.1 via a block valve 7.1 and to the wheel brakes 2.21 of the second brake circuit 1.2 via another block valve 7.2. The brake pressure generated in this case is measured by means of a pressure sensor S7. By means of these block valves 7.1 and 7.2, the hydraulic connection between the master brake cylinder 5 and the first and second brake circuit 1.1 and 1.2 is divided in the "brake-by-wire" operating mode.

Using displacement sensor S8, the extent of a pedal actuation brought about by the driver, i.e. the movement of a piston rod of the wheel brake cylinder 5, said piston rod being connected to the brake pedal 6, is determined and represents a braking demand of the driver. The displacement simulator 13 is coupled hydraulically to the master brake cylinder 5 and simulates a haptic feedback corresponding to the brake pressure generated, i.e. a corresponding pedal feel, to the brake pedal 6.

The electrically controllable pressure source 3 is designed, for example, as a single-circuit electrohydraulic actuator, the piston 3.0 of which can be actuated by an electric motor 4 via a rotation/translation mechanism. The piston 3.0 delimits a pressure space, which is connected to the pressure medium reservoir 5.2 in order to draw in pressure medium. The position of the piston 3.0 is determined from the rotor position of the electric motor 4, which is determined by means of a rotor position sensor S4, thus allowing the pressure medium volume delivered to be determined from said piston position.

A leak during the "brake-by-wire" operating mode is detected by using the pressure sensor S to measure the brake pressure generated during a braking operation, e.g. an ABS control operation, with the circuit block valves 12.1 and 12.2 open, and determining the pressure medium volume delivered for this brake pressure by means of the speed sensor S4. Depending on the brake pressure determined, a model value for the pressure medium volume delivered at this determined brake pressure is determined by means of the control unit 20, wherein the model value indicates a theoretically correct value of the pressure medium volume required to build up the pressure value detected. The pressure medium volume determined by means of the rotor position sensor S4 is compared with this model value. If the difference between the pressure medium volume determined and the model value thereof exceeds a specified threshold, the presence of a leak in the brake system 1 is assumed.

The model value for the pressure medium volume is determined by means of a pressure/volume characteristic stored in the control unit 20 in accordance with the brake pressure measured by means of the pressure sensor S. The identified leak in the brake system is located by first of all isolating one of the two brake circuits 1.1 or 1.2 and continuing to subject the other brake circuit 1.2 or 1.1 to ABS control.

Isolation of the first brake circuit 1.1, for example, is accomplished by controlling this first brake circuit 1.1 in such a way in synchronism with the ABS control operation in the second brake circuit 1.2 that the stability of the vehicle in terms of driving dynamics continues to be assured, e.g. by supplying the wheels 2.1 with a brake pressure which is just below that which would allow slip at these wheels 2.1.

This second brake circuit 1.2 is then checked for leakage by detecting the associated brake pressure using the pressure sensor S and determining the pressure medium volume delivered during the ABS or ESC control operation by means of an algorithm stored in the control unit 20 on the basis of the sensor value of the rotor position sensor S4. The measured brake pressure is used to determine a model value for the pressure medium volume, which likewise indicates a theoretically correct value of the pressure medium volume required to build up the pressure value detected, and this model value is compared with the pressure medium volume determined and, if appropriate, a leak is identified by the control unit 20 by setting a leakage flag if the difference exceeds a specified threshold. If, on the other hand, no leak is identified, it is assumed that the leak is located in the isolated brake circuit 1.1. This isolated state of the first brake circuit 1.1 is maintained until the cause of the leak is removed.

If, on the other hand, no leak is identified in this second brake circuit 1.2, the second brake circuit 1.2 is then isolated, and the first brake circuit 1.1 is checked for leaks during an ABS control operation in order to confirm that the leak must be in the first brake circuit 1.1. For this purpose, the second brake circuit 1.2 is controlled in such a way in synchronism with the ABS control of the first brake circuit 1.1 that the stability of the vehicle in terms of driving dynamics continues to be assured, e.g. by supplying the wheels 2.2 with a brake pressure which is just below that which would allow slip at these wheels 2.2.

The first brake circuit 1.1 is checked for leakage in the same way by detecting the associated brake pressure using the pressure sensor S and determining the pressure medium volume delivered during the ABS or ESC control operation by means of an algorithm stored in the control unit 20 on the basis of the sensor value of the rotor position sensor S4. The measured brake pressure is used to determine a model value for the pressure medium volume, which likewise indicates a theoretically correct value of the pressure medium volume required to build up the pressure value detected, and this model value is compared with the pressure medium volume determined and a leak is identified by the control unit 20 by setting a leakage flag if the difference exceeds a specified threshold. If this leak is located in the first brake circuit 1.1, the isolated state of this first brake circuit 1.1 is maintained until the cause of the leak is removed.

Figure 2:
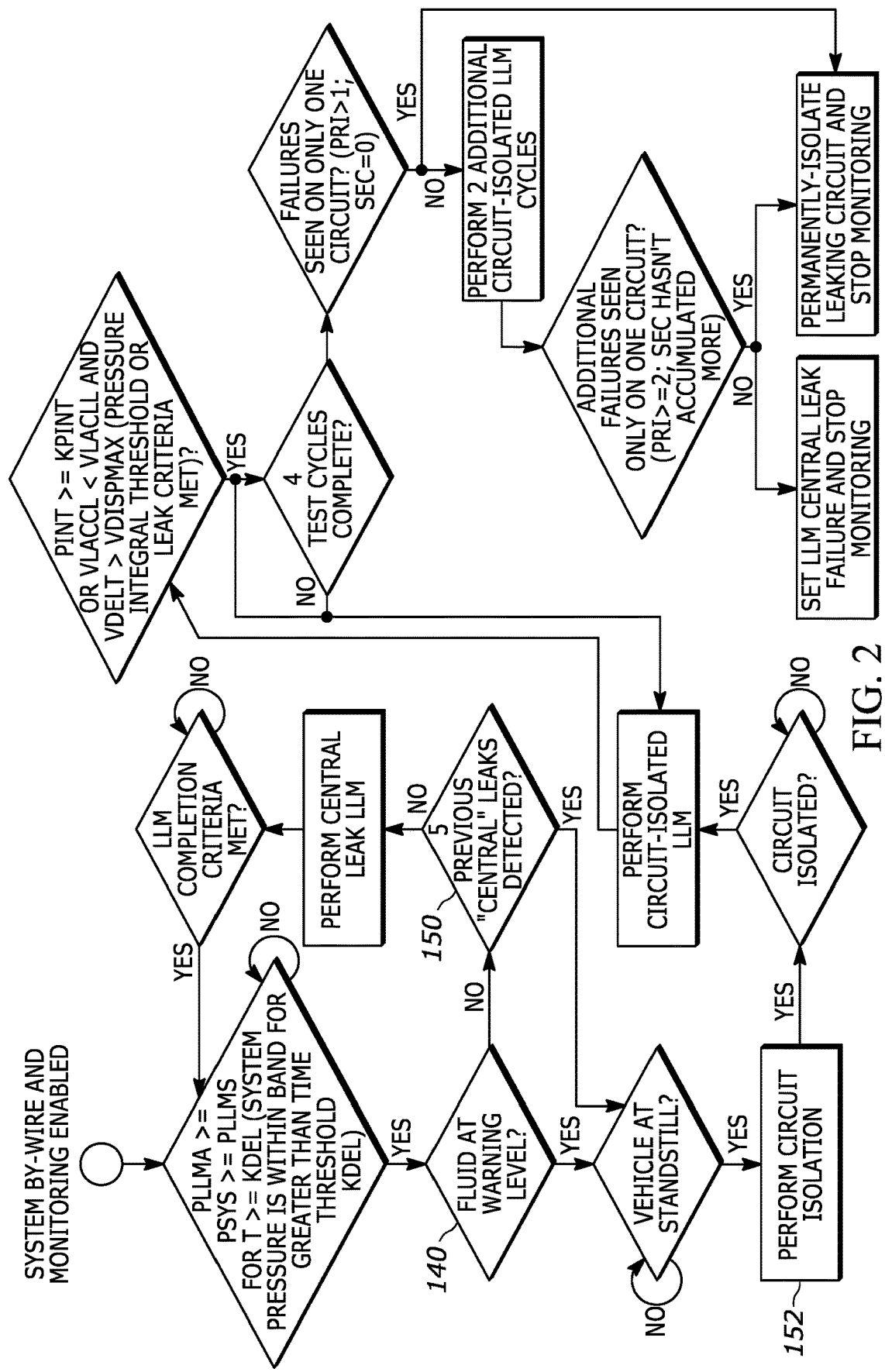
FIG. 2 illustrates a flowchart illustrating a method of use of the leak detection system, as constructed in accordance with one or more embodiments.

The most significant advantage of this leak location in an electrohydraulic brake system shown in FIG. 2 during an ongoing ABS control operation can be regarded as the fact that no additional sensors are required. The location of the leak can be achieved in all operating situations of the brake system using the existing sensors S to detect the pressure generated by the pressure source 3 and the pressure medium volume delivered by the pressure source 3.

A flow chart of the method is shown in FIG. 2, where the method can be used within the system described above (FIG. 1), and in addition to the leakage monitoring discussed above. The method includes a volume flow algorithm which takes into account that, while the vehicle is at a secure standstill, there will likely be moderate perturbations in the driver input while monitoring is taking place. Due to this deviation, complications arise in the calculation of the volume displaced while the pedal is applied, as the volume displacement values derived from the empirical mapping function between pressure and volume will be varying continuously as pedal force/travel change. This is resolved using a specialized application of the mean value theorem, in which a mean value of a function can be approximated (approximated—not exactly—calculated, given that the data derived from these calculations is modeled/discrete, therefore numerical approximations can suffice given suitable error bounds) using the area under said curve (the pressure integral), and the limits of integration in which the calculation is taken (time period in which volume flow is monitored).

Entry into volume deviation monitoring (VDM) small leak monitoring is achieved when the amount of requested pressure is greater than $E*P_{sec}$ where E is a constant which ensures a robust entry considering typical ranges of variation, and where $P_{sec}$ is the minimum amount of hydraulic pressure necessary to keep the vehicle stationary while counteracting forces exerted by the vehicle's powertrain and environmental forces, and/or to achieve a vehicle deceleration of $$2.44 \, \frac{m}{s^2}.$$

while in motion.

In one example E=0.75. Once this pressure value, which will be referred to herein as $P_{llms}$, is exceeded, a counter, $C_{del}$ begins to count given that the vehicle pressure, $P_{sys} > P_{llms}$.

The counter will reset back to 0 and monitoring is paused if a certain multiple of $P_{llms}$, referred to herein as $P_{llma} = 3*P_{llms}$, is exceeded, or if $P_{sys} \leq P_{llms}$. That being said, any arbitrary amount of pressure can be used for $P_{llma}$ and $P_{llms}$ given that safety implications of said values are carefully considered.

A maximum entry delay, $K_{del}$, is defined on a per-application basis, but herein, $K_{del}=25$. Once $C_{del} > K_{del}$, four different values are fixed for use in deviation calculations.

$V_{der_0}$—The "derived" volume at the start of monitoring (or "empirical" volume calculated from the amount of measured system pressure using the redundant pressure sensors)

$P_{sys_0}$—The system pressure at the start of monitoring $V_{lac_0}$—The actual amount of volume that has been consumed as of the point in which monitoring began (herein, the amount of cylindrical volume the ball-screw drive piston has displaced from the defined "zero position", but this can be applied to any mechanism of pressure build-up that is capable of real-time tracking of volume consumption)

$V_{lac_{l_l}}$—The actual amount of volume consumed as of the prior loop (for example 10 ms). This is only fixed in the current loop, as it will ratchet down and be updated at the end of the loop to be used in the next loop.

If in each monitoring loop (for example 10 ms), $P_{sys} > P_{sec}$, the current system pressure will be added to the pressure integral, $P_{inf}$, and the variables listed below are updated to perform the leakage detection. This is the mechanism used to calculate the pressure integral.

$V_{der_{cl}}$—The "derived" volume (based upon empirical, meaning by CFD or data analysis, mapping of pressure to volume) in the current loop.

$P_{sys_{cl}}$—The system pressure in the current loop.

$V_{lac_{cl}}$—The absolute amount of volume consumed by the system as of the current loop.

$V_{disp_{max}}$—The maximum permitted volume that can be displaced in a leak-free system.

$V_\Delta$—The amount of volume consumed since monitoring began

Where the calculations are:

$V_{disp_{max}} = (V_{der_{cl}} - V_{der_0}) + V_{thresh}$ (where $V_{thresh}$ is an maximum offset "deviation boundary" from the expected values from the current position on the pressure/volume mapping function)

$V_\Delta = V_{lac_{cl}} - V_{lac_0}$

At this point, testing can be interrupted at any time if any of the below-listed criteria are met.

$|P_{sys_0} - P_{sis_{cl}}| > P_{dev_{max}}$, where $P_{dev\ max}$ is a maximum deviation from the test start pressure to the current pressure, which at the moment is 5 bar.

$V_{lac_{cl}} < V_{lac_{ll}}$ AND $V_\Delta > V_{disp_{max}}$

If testing continues based upon the aforementioned criteria, a check to see if additional volume displacement is still occurring (meaning additional volume needs to be displaced to maintain the requested pressure based upon the driver's request, or mathematically, $V_{lac_{cl}} \geq V_{lac_{ll}}$), and if so, if the total displaced volume during the test sequence exceeds the threshold of that which is permitted in a leak-free system (mathematically, $V_\Delta > (V_{lac_{cl}} - V_{disp_{max}})$), a counter, $C_{errl}$ is incremented. If not, $C_{errl}$ is decremented by one.

For final determination of a pass/failure, the variable listed below is calculated and compared to ensure adequate data is sampled.

$P_{int_{exp}} = (T_{mon} + K_{del}) * P_{llms}$—Essentially, the "expected area" under an "ideal curve" in a scenario in which the average pressure of $P_{llms}$ is exactly maintained for a time of $T_{mon}$, plus the time (in milliseconds, converted from "monitoring loops" (for example 10 ms), or 10 ($K_{del}$)) of delay expected to begin monitoring.

If $$P_{int} \geq P_{int_{exp}},$$

it is to be assumed that sufficient data samples have been collected for proper detection.

This allows differing levels of pressure to not interfere with the requisite number of data samples needed for detection, in that using $P_{int}$ ensures that the "peaks and valleys" of the varying pressure sum to that which would occur given a "flat" pressure request.

Mathematically, this makes sense, as this would be a case of any two continuous functions (assuming continuity here for simplicity's sake—these calculations are, however, performed using numerical methods) whose average values are equal per the mean value theorem of calculus, say f(t) and g(t), where $$\frac{\int_a^b f(t)dt}{b-a} = \frac{\int_a^b g(t)dt}{b-a}.$$

Subsequently multiplying by (b–a) on both sides, leaves us with the use case described herein, namely $$\int_a^b f(t)dt = \int_a^b g(t)dt,$$

proving this is sufficient to be used as a limiting mechanism for data samples.

Normal small leakage detection (based upon the strategy described above) will take place in a failure free system (meaning, a normal fluid level as-sensed by a brake fluid level sensor with enough precision to indicate a level in which only driver notification is necessary, no former leaks and/or pressure deviations, etc. . . . ).

If a leak were to occur, normal small leak detection using the algorithm discussed above occur for $K_{lappl}$ failed brake applies (either at standstill or at a velocity greater than 0).

A brake apply is to be defined as one or more of the following criteria are met:

1. A full leakage test cycle reaching completion while still maintaining $P_{llma} > P_{sys} > P_{llms}$.

2. Going from fully-pressureless, meaning $P_{sys}=0$, to $P_{llma} > P_{sys} > P_{llms}$ for only long enough for a test cycle to complete, and the system goes fully pressureless once more.

3. A full leakage test cycle reaching completion while still maintaining $P_{llma} > P_{sys} > P_{llms}$, then after completion, $P_{llma} > P_{sys} > P_{llms}$, the vehicle velocity has gone from greater than 0 to standstill.

Said $K_{lappl}$ applies need not be sequential, meaning that only $K_{lappl}$ total, unique (based upon the criteria given above), failed test cycles need to occur.

If five unique failed applies are seen (keeping in mind, that per definition, multiple, unique "applies" can occur sequentially if a test cycle completes while the system is still pressurized within the prescribed conditions), then on the sixth cycle, the monitoring logic will begin to alternate isolation and pressurization of each, individual brake circuit using valves (meaning, assuming a black/white split, on each successive monitoring cycle, the rear axle will be isolated by closing the inlet valves, then the front axle, etc. . . . ). (See 150, 152).

The aforementioned alternating of circuit isolation will also occur if the brake fluid level sensor indicates a "driver alert" level of fluid being low (meaning fluid is low, but there is little danger of air intrusion into the system due to lack of available volume needed to reach $P_{sys} \leq P_{sec}$). (See 140).

During said isolation cycles, testing will be done according to the original method listed in the prior section, with the below-listed caveats.

The number of test cycles of each, independent circuit, ($C_{fail_i}$, where i is the axle/circuit identifier from 0-2 signifying combined, primary, and secondary respectively, including the initial $K_{lappl}$ "system", or "combined" tests using the "normal" both-circuit method) is tracked as done before.

Once $K_{lappl}$ failures are detected, the number of cycles will be re-evaluated and the monitoring will begin to track the number of failures in each circuit individually.

It should also be noted that once isolation takes place, a dash warning lamp will illuminate to indicate to the driver that his/her car has a serious issue and should be inspected immediately. For example, the fluid is at a warning level if it is at a level that is low, but not critical (where there is risk of air being sucked into the system).

Calculation of certain thresholds must be modified once the monitoring is certain that the circuit has been successfully shut off (see below) to ensure that the volumetric curves reflect the expected lower volume consumptions (there is a unique pressure-volume mapping function for each monitored circuit).

$V_{der_0}$—The circuit-specific "derived" volume at the start of monitoring once isolation occurs $V_{disp_{max}} = (V_{der_{cl}} - V_{der_0}) + V_{thresh}$, same as before, but must be recalculated once isolation succeeds, as the derived volume will change once it occurs Due to the fact that a leak has been identified in this case, it is to be assumed that additional loss of brake fluid volume is to be expected, and given this fact, when isolation is taking place, the circuit(s) that contain(s) the leak will likely have significantly-degraded braking performance when being tested. That being said, once at least $K_{lappl}$ failed cycles have been observed, monitoring will only take place when the vehicle is verified to be at standstill, for example at a secure standstill when all four wheels are at zero movement for a certain amount of time. In one or more embodiments, secure standstill is determined upon confirmed absence of movement of a vehicle based upon sanity checked and/or redundant data. Monitoring will immediately abort should the vehicle leave standstill, both circuits will be opened so that both axles will be used for braking force, and monitoring will resume on the same circuit that was being tested prior to drive-off.

If the testing should be interrupted due to high deviations in $P_{sys}$, a decrease in $V_A$, or (as described above) the vehicle leaving standstill, the currently-tested circuit will be re-tested on the next unique apply (meaning no alternation will occur until a test cycle completes on the interrupted circuit—whether by leak detection or successful completion with no leak).

Each successive time a circuit being tested indicates a leak, $C_{fail_i}$ is incremented, where i is the circuit being tested.

Four previous unique cycles are completed. The cycles are a full cycle, at standstill, based upon the following criteria:
1. A full leakage test cycle reaching completion while still maintaining $P_{llma} > P_{sys} > P_{llms}$.
2. Going from fully-pressureless, meaning $P_{sys}=0$, to $P_{llma} > P_{sys} > P_{llms}$ for only long enough for a test cycle to complete, and the system goes fully pressureless once more.
3. A full leakage test cycle reaching completion while still maintaining $P_{llma} > P_{sys} > P_{llms}$, then after completion, $P_{llma} > P_{sys} > P_{llms}$, the vehicle velocity has gone from greater than 0 to standstill.

Once the four previous unique cycles have been completed, if the current test on circuit i indicates a leak exists, $C_{fail_i} \geq 2$, AND if leaks were seen on the "other" circuit (meaning $C_{fail_j} \geq 1$, where circuit "j" is the opposing circuit to "i"), and the sum of the total failed test cycles, $C_{fail_i} + C_{fail_j} < 4$, two additional cycles are performed to determine if either only one circuit is actually leaking and there was a false detection, or if both circuits do, indeed have a leak. If after the sixth complete cycle, more than one failure is seen on each circuit, a "central" leak is likely to exist, meaning that both circuits are leaking.

If the currently-tested circuit, $C_i$ indicates a leak exists, $C_{fail_i} \geq 2$, and NO leaks were seen on the "other" circuit, the inlet valves for $C_i$ are to be permanently-shut until the vehicle is serviced and failures are manually-cleared by a technician to prevent further fluid loss.

In one or more embodiments, a method for detecting a small hydraulic leak of braking fluid in a vehicle, the vehicle having at least a first braking circuit and a second braking circuit, the method includes determining whether system braking pressure falls within a predetermined range. The method further includes determining whether leakage exists in the braking circuits, determining whether the vehicle is in secure standstill, monitoring small leakage of a braking circuit while the vehicle is in secure standstill if leakage was detected and the vehicle is in the secure standstill, and isolating at least one of the braking circuits if a leakage exists in one of the braking circuits.

In one or more embodiments, the method further includes determining whether a pressure integral threshold is met and/or the leakage is above a predetermined level is found in at least one of the braking circuits.

In one or more embodiments, the predetermined level is a leakage of >0.01 cc/bar/s.

In one or more embodiments, determining whether the pressure integral threshold is met and/or the leakage is above the predetermined level includes determining if Pint>=Kpint or $V_{lac_{cl}} < V_{lac_{ll}}$ AND $V_A > V_{disp_{max}}$ (pressure integral threshold and/or leakage criteria met). The pressure integral threshold would be heavily-dependent on vehicle parameters. In one example, the pressure integral threshold is 4 seconds at the pressure when monitoring started. So, for example at 100 bar, it'd be 400 bar*s, or the equivalent of the area under the function y=100 from x=0–>4.

In one or more embodiments, the predetermined leakage level, dependent on vehicle, is at least 1 cc/s and system pressure is 100 bar.

In one or more embodiments, the circuit isolated low level monitor is performed for at least four cycles if the pressure integral threshold is met and/or the leakage is above a predetermined level is found.

In one or more embodiments, the method further includes permanently isolating the leaking circuit and cease monitoring for leakage if leakage is found in only one of the first braking circuit or the second braking circuit.

In one or more embodiments, the method further includes performing circuit isolated low level monitoring on each the first braking circuit and the second braking circuit if leakage found in each of the first braking circuit or the second braking circuit.

In one or more embodiments, the method further includes performing circuit isolated low level monitoring for each of the first braking circuit and the second braking circuit independent of one another.

In one or more embodiments, performing circuit isolated low level monitoring for each of the first braking circuit and the second braking circuit occurs for at least two additional cycles.

In one or more embodiments, if additional leakage failures are found in both circuits, a central leak failure is set, and monitoring is ceased.

In one or more embodiments, permanently isolating the leaking circuit and cease monitoring for leakage if additional leakage failures are found in only one circuit.

In one or more embodiments, the method further includes determining whether the braking fluid is at a warning level.

The above description is intended to be illustrative, and not restrictive. Many other embodiments will be apparent to those of skill in the art upon reading and understanding the above description. Embodiments discussed in different portions of the description or referred to in different drawings can be combined to form additional embodiments of the present application. The scope should, therefore, be determined with reference to the appended claims, along with the full scope of equivalents to which such claims are entitled.

The invention claimed is:

1. A method for detecting a small hydraulic leak of braking fluid in a vehicle, the vehicle having at least a first braking circuit and a second braking circuit, the method comprising:
   determining whether system braking pressure falls within a predetermined range;
   determining whether leakage exists in at least one of the braking circuits;
   determining whether the vehicle is in secure standstill;
   isolating the at least one of the braking circuits when a leakage exists in one of the braking circuits; and monitoring the leakage for at least four cycles while the vehicle is in secure standstill when one of a pressure integral threshold is met and the leakage is above a predetermined level in the at least one of the braking circuits.

2. The method as recited in claim 1, wherein the predetermined level is a leakage of >0.01 cc/bar/s.

3. The method as recited in claim 1, wherein determining whether the pressure integral threshold is met and/or the leakage is above the predetermined level includes determining if Pint>=Kpint or $V_{lac_{ij}}$ AND $V_A > V_{disp_{max}}$ (pressure integral threshold and/or leakage criteria met).

4. The method as recited in claim 3, wherein the predetermined leakage level is at least 1 cc/s and system pressure is 100 bar.

5. The method as recited in claim 1, wherein the predetermined level is a leakage of >0.01 cc/bar/s.

6. The method as recited in claim 1, further comprising permanently isolating the leaking circuit and cease monitoring for leakage if leakage is found in only one of the first braking circuit or the second braking circuit.

7. The method as recited in claim 1, further comprising performing circuit isolated monitoring on each the first braking circuit and the second braking circuit if leakage found in each of the first braking circuit or the second braking circuit.

8. The method as recited in claim 7, further comprising performing circuit isolated monitoring for each of the first braking circuit and the second braking circuit independent of one another.

9. The method as recited in claim 8, wherein performing circuit isolated monitoring for each of the first braking circuit and the second braking circuit occurs for at least two additional cycles.

10. The method as recited in claim 7, wherein if additional leakage failures are found in both circuits, a central leak failure is set, and monitoring is ceased.

11. The method as recited in claim 7, wherein permanently isolating the leaking circuit and cease monitoring for leakage if additional leakage failures are found in only one circuit.

12. The method as recited in claim 1, further comprising determining whether the braking fluid is at a warning level.

* * * * *